F. M. HAIRGROVE.
ICE CUTTING DEVICE.
APPLICATION FILED SEPT. 18, 1916.
1,302,917.
Patented May 6, 1919.
Fig. I.
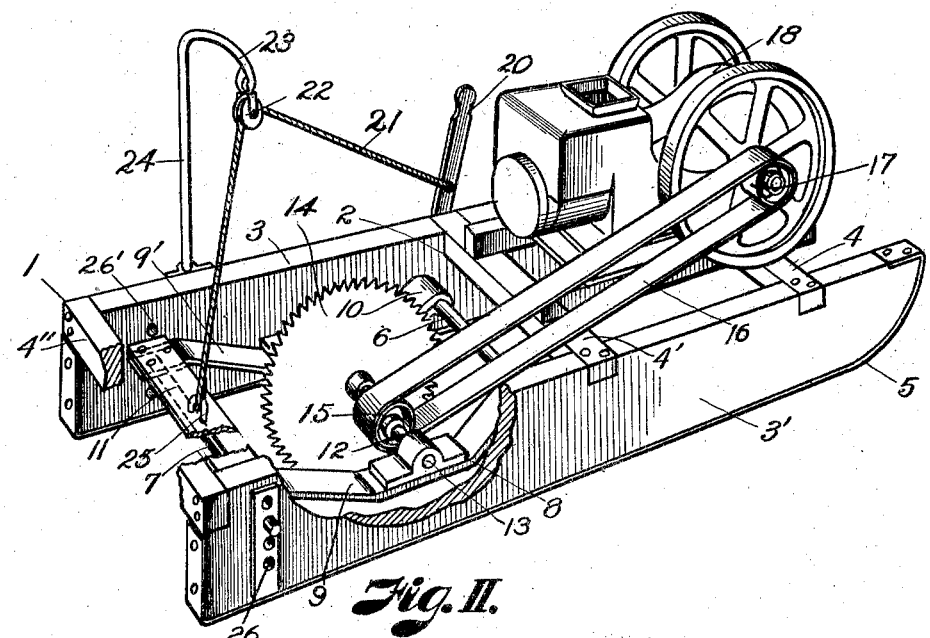
Fig. II.
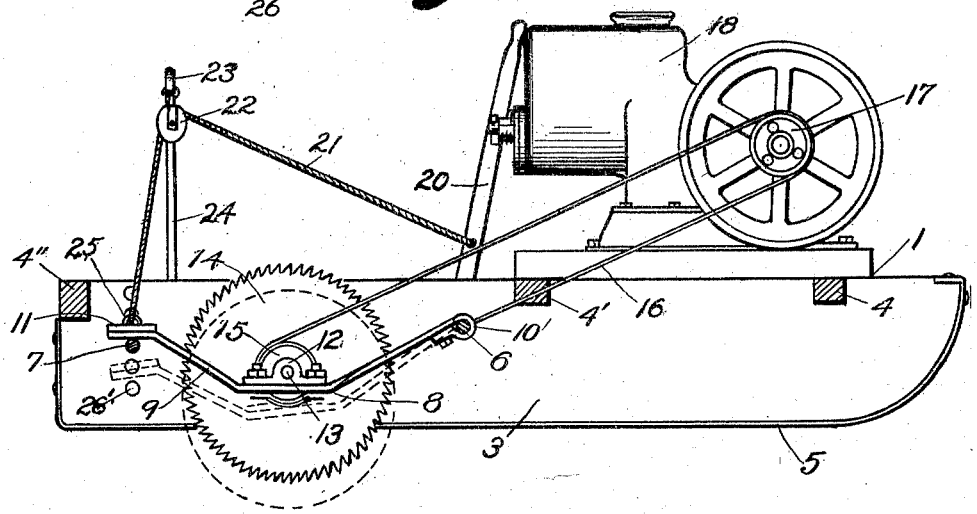
INVENTOR.
Francis M. Hairgrove.
BY
Arthur C. Brown
ATTORNEY.

UNITED STATES PATENT OFFICE.

FRANCIS M. HAIRGROVE, OF BROWNVILLE, NEBRASKA, ASSIGNOR OF ONE-HALF TO IRA J. HAIRGROVE, OF BROWNVILLE, NEBRASKA.

ICE-CUTTING DEVICE.

1,302,917.    Specification of Letters Patent.    Patented May 6, 1919.

Application filed September 18, 1916. Serial No. 120,666.

*To all whom it may concern:*

Be it known that I, FRANCIS M. HAIRGROVE, a citizen of the United States, residing at Brownville, in the county of Nemaha and State of Nebraska, have invented certain new and useful Improvements in Ice-Cutting Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an ice cutting device, and has for its principal object to provide a motor driven device of this character, whereby river or lake ice may be quickly cut, and wherein improved means is provided for adjustably supporting the saw to adapt it to ice layers of different thicknesses.

A further object of the invention is to provide a lever mechanism for raising the saw frame, and means for supporting the saw at a desired cutting depth.

In accomplishing these objects I have provided improved details of structure, the preferred forms of which are illustrated in the accompanying drawings, wherein:—

Figure I is a perspective view of an ice cutting device embodying my invention, parts being broken away for better illustration.

Fig. II is a longitudinal section of the same, particularly illustrating the pivotal mounting of the saw frame.

Referring more in detail to the drawings:—

1 designates an ice cutting device constructed according to my invention, comprising a sled body 2, having side runners 3—3', which are rigidly braced and held substantially in spaced relation by cross beams 4—4'—4", on which latter the saw motor is mounted.

Each of the runners 3—3' is curved upwardly at its forward end and the runner surfaces are overlaid by smooth metal strips 5, which facilitates moving of the device about over the ice surface and prevents wearing away of the runners.

Pivotally suspended at one end on a cross shaft 6 that is mounted in and extends between the runners 3—3' and supported at its opposite end on a similar cross shaft 7, is a saw frame 8; the said frame comprising spaced side rails 9—9' provided at their forward ends with loops 10—10' for pivotally receiving the shaft 6 and having free opposite ends that overlie the shaft 7 and are connected by a cross piece 11.

Mounted on the frame side rails 9—9' are oppositely placed bearings 12, which revolubly carry a cross shaft 13 on which is mounted a circular saw 14; the shaft 13 is also provided with a pulley wheel 15 for carrying a belt 16 that also runs over a pulley wheel 17 of an engine 18, of any suitable character that may be carried on the forward cross rails 4—4'. The open saw carrying frame, which is mounted at its front end on the transverse pivot, has its side portions guided by the runners and the said side portions are oppositely inclined, the front inclined portions extending downwardly and rearwardly from the transverse pivot in substantial parallelism with the driving belt, which is arranged at an inclination. The rear and downwardly extending inclined portion of the saw carrying frame terminates in substantially the same horizontal plane as the front end. This particular arrangement enables the saw to be driven by a belt from a motor on the sled with the least effect on the adjustment of the saw and enables the adjusting mechanism to be readily mounted on the sled without affecting the operation of the latter.

In order to facilitate raising or lowering of the saw to adapt the latter to the character of ice being cut, or to raise the same entirely from a cutting position, I provide a lifting lever 20, which is pivotally mounted at its lower end on the runner 3, and attached to the lever is one end of a cable 21 which runs over a pulley wheel 22 suspended from an inwardly directed arm 23 of a standard 24 carried on the runner 3, and is attached at its opposite end, by means of a U-link 25, to the frame cross piece 11.

With the lifting lever so placed and the cable attached thereto and to the saw frame, it is apparent that by a forward movement of the lever the free end of the saw frame will be raised and the saw lifted from the ice surface. At the same time, the belt will be slackened sufficiently so as not to drive the saw when it is raised from the ice.

In order that the saw, after being raised or lowered, may be held in its adjusted position, the shaft 7, on which the free end of the saw frame is supported, is removably carried in the runners 3—3', and may be mounted at its oppositely disposed apertures 26—26' in the said runners, the manner of adjusting the saw being to draw forwardly on the lever 18 to raise the frame 8 sufficiently to allow the shaft 7 to be seated at its ends in opposite apertures of suitable height and then to lower the frame by allowing the lifting lever to move rearwardly, so that the frame rails 9—9' come to rest on the shaft 7 in its adjusted position.

Assuming that the device is so constructed, it will be seen that when the saw is lowered to cutting position the belt will be tightened so that the motor will revolve the saw shaft and the saw frame may be adjusted to raise or lower the saw to cut ice layers of various depths.

It will also be seen that by a forward movement of the lifting lever the saw may be raised from cutting position and the latter may be supported in any desired elevation by proper placing of the supporting shaft 7.

While I have shown a sled body of wooden construction I do not wish to limit the device to such, as it is apparent that a metal construction could be provided without departing from the spirit of the invention.

Having thus described my invention what I claim as new therein and desire to secure by Letters-Patent, is:—

The combination of a sled having spaced runners and provided with a transverse pivot, of a saw carrying frame mounted at the front end upon the transverse pivot and having spaced sides guided by the runners, said sides being composed of oppositely inclined front portions, the front portions extending downwardly and rearwardly from the said pivot and the rear portions of the sides extending upwardly and rearwardly, a saw mounted upon the frame at the adjacent ends of the front and rear inclined portions of the sides, a motor mounted upon the sled in advance of the said pivot and inclined belt connecting the motor with the saw and arranged between and in substantial parallelism with the inclined front portion of the sides of the said frame and adjusting means mounted upon the sled and connected with the said frame at the rear end thereof.

In testimony whereof I affix my signature.

FRANCIS M. HAIRGROVE.

Copies of this patent may be obtained for five cents each, by addressing the "Commissioner of Patents, Washington, D. C."